(12) United States Patent
Jasleen et al.

(10) Patent No.: US 12,393,468 B2
(45) Date of Patent: Aug. 19, 2025

(54) MODEL-BASED RESOURCE ALLOCATION FOR AN INFORMATION HANDLING SYSTEM

(71) Applicant: Dell Products L.P., Round Rock, TX (US)

(72) Inventors: Fnu Jasleen, Austin, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 881 days.

(21) Appl. No.: 17/144,512

(22) Filed: Jan. 8, 2021

(65) Prior Publication Data
US 2022/0222122 A1 Jul. 14, 2022

(51) Int. Cl.
*G06F 9/50* (2006.01)
*G06N 20/00* (2019.01)

(52) U.S. Cl.
CPC .......... *G06F 9/5055* (2013.01); *G06N 20/00* (2019.01)

(58) Field of Classification Search
CPC .................................................. G06F 9/5055
See application file for complete search history.

(56) References Cited

U.S. PATENT DOCUMENTS

| | | | | |
|---|---|---|---|---|
| 10,503,548 | B2* | 12/2019 | Narayanamurthy | G06F 9/4887 |
| 10,540,355 | B1* | 1/2020 | Agnich | G06F 16/25 |
| 11,010,026 | B1* | 5/2021 | Brown | G06Q 30/0641 |
| 11,025,495 | B1* | 6/2021 | Bhatnagar | G06F 9/5077 |
| 11,630,706 | B2* | 4/2023 | Doshi | G06F 9/5005 |
| | | | | 718/104 |
| 2002/0159642 | A1* | 10/2002 | Whitney | G06F 18/41 |
| | | | | 382/225 |
| 2015/0373107 | A1* | 12/2015 | Chan | H04L 67/1095 |
| | | | | 709/205 |
| 2016/0117202 | A1* | 4/2016 | Zamer | G06N 20/00 |
| | | | | 719/320 |
| 2017/0149690 | A1* | 5/2017 | Le Rudulier | H04L 47/821 |
| 2018/0316626 | A1* | 11/2018 | Tian | H04L 47/803 |
| 2019/0205173 | A1* | 7/2019 | Gupta | G06F 9/5027 |

(Continued)

*Primary Examiner* — Lewis A Bullock, Jr.
*Assistant Examiner* — Kevin X Lu
(74) *Attorney, Agent, or Firm* — Norton Rose Fulbright US LLP

(57) ABSTRACT

User responsiveness on an information handling system may be improved by classifying an application based on its importance and/or relevance for an individual user with the goal of prioritizing resource allocation to improve responsiveness and performance of applications. The classification may include analyzing telemetry data to determine the most important applications for a user, such as by determining an application's importance and/or relevance to a particular user, and determine the resource utilization of that application from a macro perspective. After classification, changing characteristics of an application may be monitored and used to dynamically allocate system resources to the application during runtime. In this manner, priority on resource allocations for certain resources may be adapted to fit the user and the application, and adapt to the changing requirements and scenarios. The determination of application importance and/or relevance and subsequent adaptation of system resource allocation may be performed using a model-based algorithm.

9 Claims, 7 Drawing Sheets

(56) References Cited

U.S. PATENT DOCUMENTS

| | | | | |
|---|---|---|---|---|
| 2019/0339885 A1* | 11/2019 | Yanagihara | .......... | G06F 12/0802 |
| 2020/0050530 A1* | 2/2020 | Orth | .................... | G06F 11/3419 |
| 2020/0106861 A1* | 4/2020 | Heiser | ................... | B60W 50/04 |
| 2020/0241917 A1* | 7/2020 | Chen | .................... | G06F 9/3836 |
| 2020/0258013 A1* | 8/2020 | Monnett | ............. | H04L 41/5074 |
| 2020/0264928 A1* | 8/2020 | Kalmuk | ................ | G06F 9/5011 |
| 2020/0272509 A1* | 8/2020 | Wright | .................. | G06F 9/5038 |
| 2021/0051208 A1* | 2/2021 | Ramasamy | ............ | G06F 18/214 |
| 2021/0117237 A1* | 4/2021 | Liu | ........................ | G06F 9/5027 |
| 2021/0409478 A1* | 12/2021 | Choi | ................... | H04L 67/5682 |
| 2022/0027744 A1* | 1/2022 | Krishnan | ......... | G06Q 10/06315 |
| 2022/0132387 A1* | 4/2022 | Schnieders | ....... | H04W 36/0016 |
| 2022/0179706 A1* | 6/2022 | Khosrowpour | ..... | G06F 11/3466 |
| 2022/0286406 A1* | 9/2022 | Sethi | .................... | H04L 47/781 |

* cited by examiner

MODEL-BASED RESOURCE ALLOCATION FOR AN INFORMATION HANDLING SYSTEM

FIELD OF THE DISCLOSURE

The instant disclosure relates to information handling systems. More specifically, portions of this disclosure relate to allocation of system resources of the information handling to applications executing on the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems execute a wide variety of applications to provide functionality to users, including thousands of applications in different languages aimed at varied use cases around the globe. A user may install and execute as many as 60-90 applications, or more, in a lifetime. But, that user likely only cares about and regularly uses about 10 applications. A user uses different applications to different extents, and different users use the same application to different extents. However, computing devices generally execute all applications in a linear manner without making any distinguishing of the user or the manner of use by the user. Each information handling system has certain resources available for executing applications, such as processor cycles and memory space, that are assigned to executing applications. The assignment of resources can significantly affect the execution of, and therefore user experience with, an application. For example, an application with insufficient processor resources will appear slow by having long response times to user input. Some operating systems will prioritize certain applications based on time of usage. Most used applications may receive prioritization during resource allocation. However, the most accessed application does not always equate with the most important application to the user.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

User responsiveness on an information handling system may be improved by classifying an application based on its importance and/or relevance for an individual user with the goal of prioritizing resource allocation to improve responsiveness and performance of applications. The classification may include analyzing telemetry data to determine the most important applications for a user, such as by determining an application's importance and/or relevance to a particular user, and determine the resource utilization of that application from a macro perspective. The macro classification of an application defines the most used resource by that application. The resource used by the application throughout its runtime may be monitored to determine the most used resource. For example, if a word processing program performs I/O operations as a majority of its operations throughout its runtime, the word processing application will be given a macro classification as storage. After classification, changing characteristics of an application may be monitored and used to dynamically allocate system resources to the application during runtime. In this manner, priority on resource allocations for certain resources may be adapted to fit the user and the application and to adapt to the changing requirements and scenarios. The determination of application importance and/or relevance and subsequent adaptation of system resource allocation may be performed using a model-based algorithm. In some embodiments, the model-based algorithm is a machine learning algorithm trained using telemetry data collected by the information handling system, in which the telemetry data indicates resource utilization of applications executing on the information handling system.

In one embodiment, an application may be classified using a three-step method based on its resource utilization in response to a user's interaction with the application. The first step involves determining the most important applications for a user, which are inserted into a dynamic whitelist. The second step involves determining a macro classification of system resources consumed by the application based on the most important resource that the application is likely to use throughout its runtime. Example macro classifications include CPU, GPU, I/O, and memory. The third step involves determining system resources for allocation to the application at runtime and dynamically reallocating resources during execution of the application.

The resource allocation schemes described herein allow classifying of applications based on their priority to a user, rather than frequency of use by the user. The prioritization may be based on relevance and importance for the individual user, allowing resource allocation to be based on importance to a user to determine the most important applications, rather than time of use by a user to determine the most important applications. This aligns the allocation of the system resources on an information handling system to the user's priorities, which improves responsiveness and performance of the applications when executed by the user. The resource allocation may become more accurate over time as collected data is fed back into the model-based resource allocation to form a closed loop system that retrains the model and creates a personalized experience for the user. Macro classification of system resources for prioritized application may provide an initial improvement in the performance of an application for the user, and more performance improvements as the macro classifications and prioritization models are updated based on feedback from the system data. Dynamic resource allocation through a dynamic resource model may provide further improvements in performance over time as the application is executing.

According to one embodiment, executing, by an information handling system, an application for a user, the application using system resources of the information handling system; determining, by the information handling system, whether the application is on an application whitelist for the user; and, when the application is on the application whitelist, allocating assigned system resources to the application. The step of allocating resources may include determining, by the information handling system, a macro classification for the application associated with the application from the application whitelist; and allocating, by the information handling system, the assigned system resources based, at least in part, on the macro classification.

The application whitelist may be a dynamic whitelist by determining, by the information handling system, usage of the system resources of the information handling system by the application; and updating, by the information handling system, the application whitelist based, at least in part, on the usage of the system resources. The updating may be performed periodically or aperiodically during operation of the information handling system or at defined event times during operation of the information handling system. The update may include an update to the list of applications on the application whitelist based on changing priorities of the user and/or updating of the macro classification for the application based on determined usage of system resources by the application.

The allocation of assigned system resources may additionally include a dynamic response to use of system resources by the application in response to user requests. For example, the allocating of the assigned system resources to the application may include steps of determining, by the information handling system, system resources for functions being performed by the application; and allocating, by the information handling system, the assigned system resources based, at least in part, on the determined system resources.

The allocation of system resources in various embodiments may include up to three or more different models as part of a model-based system resource allocation process. In an embodiment of a three-model allocation process, the application whitelist based on a first model, wherein the first model determines a priority of the application to the user based, at least in part, on telemetry data. Further, the determining of the macro classification for the application comprises determining the macro classification with a second model, wherein the second model is based, at least in part, on the telemetry data; and the determining of the system resources for functions being performed by the application comprises determining the system resources with a third model, wherein the third model is based, at least in part, on the telemetry data. The third model may be trained to predict resource usage by the application based on a function being performed by the application.

The method may be embedded in a computer-readable medium as computer program code comprising instructions that cause a processor to perform the steps of the method. In some embodiments, the processor may be part of an information handling system including a first network adaptor configured to transmit data over a first network connection of a plurality of network connections; a second network adaptor configured to transmit data over a second network connection of a plurality of network connections; a memory; and a processor coupled to the first network adaptor, the second network adaptor, and the memory.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
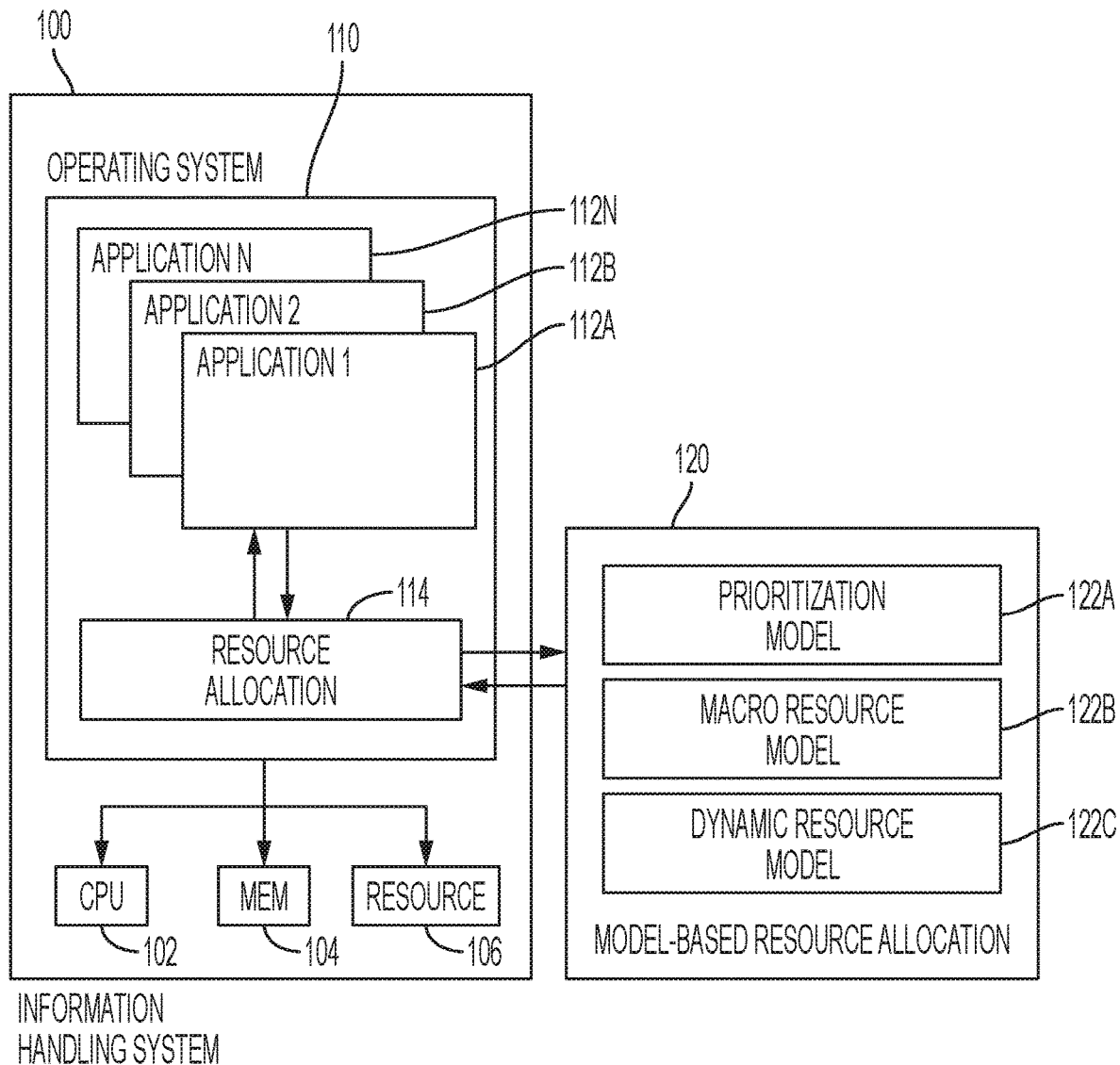
FIG. 1 is a block diagram illustrating resource allocation on an information handling system according to some embodiments of the disclosure.

FIG. 1 is a block diagram illustrating resource allocation on an information handling system according to some embodiments of the disclosure. An information handling system 100 may include a CPU 102, memory 104, and other resources 106. The CPU 102 may execute according to cycles in a clock with each instruction from the applications executing on the IHS 100 consuming a certain number of clock cycles. Each of the clock cycles may be considered an allocatable system resource or other techniques for dividing time for executing instructions on the CPU 102 which may be used. The memory 104 may have a certain capacity, measured in bytes, that is shared between all applications executing on the IHS 100, and the capacity is a system resource that may be allocated to each of the applications executing on the IHS 100. Example of other resources 106 include input/output systems to access a solid state drive (SSD), hard disk drive (HDD), and/or Flash memory through an interface such as a serial ATA (SATA) interface or a Universal Serial Bus (USB) interface. Each such interface may have a certain bandwidth available for data transfer and that available bandwidth is a system resource for an I/O interface.

An IHS 100 may execute an operating system 110 that interfaces hardware on the information handling resources, including CPU 102 and memory 104, to applications 112A-N executing on the IHS. Applications 112A-N may include user applications, background processes, operating system services, individual processes, or other computer instructions that execute within the operating system environment to perform a task by consuming one or more system resources. The operating system 110 may manage system resources of the IHS 100 for the execution of applications 112A-N through a resource allocation system 114. The resource allocation system 114 handles requests from the applications 112A-N, which may be made through application programming interfaces (APIs), and causes the applicable and available system resources to execute those requests. The resource allocation system 114 may handle resource allocation by using a model that guides the allocation of resources. In some embodiments, a model-based resource allocation subsystem 120 may monitor the IHS 100 to collect telemetry data, build a model, and use the model to provide input to the resource allocation system 114 that instructs the operating system 110 how to assign system resources to the applications 112A-N.

The model-based resource allocation subsystem 120 may include several models for determining particular aspects of resource allocation. For example, the subsystem 120 may include a prioritization model 122A, a macro resource model 122B, and/or a dynamic resource model 122C. These three models 122A-C may provide input to the resource allocation system 114 while executing a three-step method for allocating system resources. The first step of resource allocation at resource allocation system 114 involves determining the most important applications for a user based on a prioritization model 122A. The input to the resource allocation system 114 from the prioritization model 122A may be a whitelist, which may be dynamically updating during execution of the applications 112A-N at periodic or aperiodic intervals. The second step of resource allocation at resource allocation system 114 involves determining a macro classification of system resources consumed by an application based on a macro resource model 122B indicating the most important resource that the application is likely to use throughout its runtime. The input to the resource allocation system 114 from macro resource model 122B may be associations of applications, including one or more of applications 112A-C executing on the IHS 100, with classifications of a most-used resource, such as CPU, GPU, I/O, or memory. The third step of resource allocation at resource allocation system 114 involves determining system resources for allocation to the application at runtime based on a dynamic resource model 122C. The dynamic resource model 122C may be updated during execution of the applications 112A-N based on telemetry data collected by the operating system 110. The input to the resource allocation system 114 from dynamic resource model 122C may include an amount of memory, a number of clock cycles, an amount of I/O system bandwidth, or similar assignments of system resources for one or more of the applications 112A-N.

Figure 2:
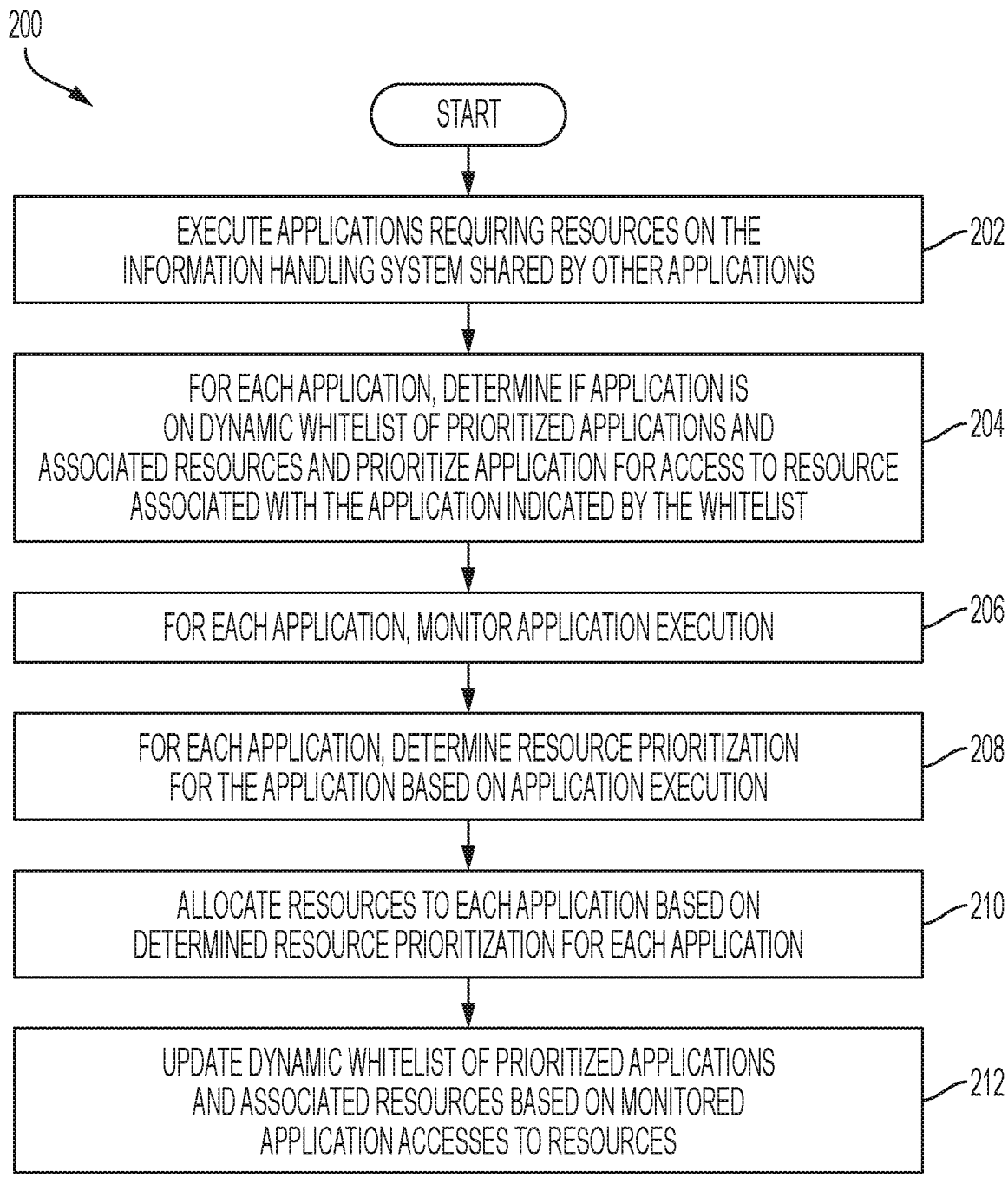
FIG. 2 is a flow chart illustrating a method for allocating resources on an information handling system according to some embodiments of the disclosure.

One method of operation for the IHS 100 using model-based resource allocation, such as in the model-based resource allocation subsystem 120 shown in FIG. 1 is shown in the flow chart of FIG. 2. FIG. 2 is a flow chart illustrating a method for allocating resources on an information handling system according to some embodiments of the disclosure. A method 200 begins at block 202 with executing applications requiring resources, such as CPU, member, and I/O bandwidth, on the information handling system (IHS) shared by other applications. At block 204, for each application, the IHS determines if an application is on a dynamic whitelist of prioritized applications and associated resources. If the application is on the whitelist, the associated resource in the whitelist is prioritized for the application. At block 206, the IHS monitors the execution of each application and may collect telemetry data regarding system resource usage by the application and/or data about application execution. At block 208, a resource prioritization is determined for each application based on the telemetry data collected at block 206. At block 210, resources are allocated to the application based on the determined resource prioritization of block 208. At block 212, the whitelist in the model and associated resources are updated based on continued monitoring of the application and system resource utilization by the application.

Figure 3:
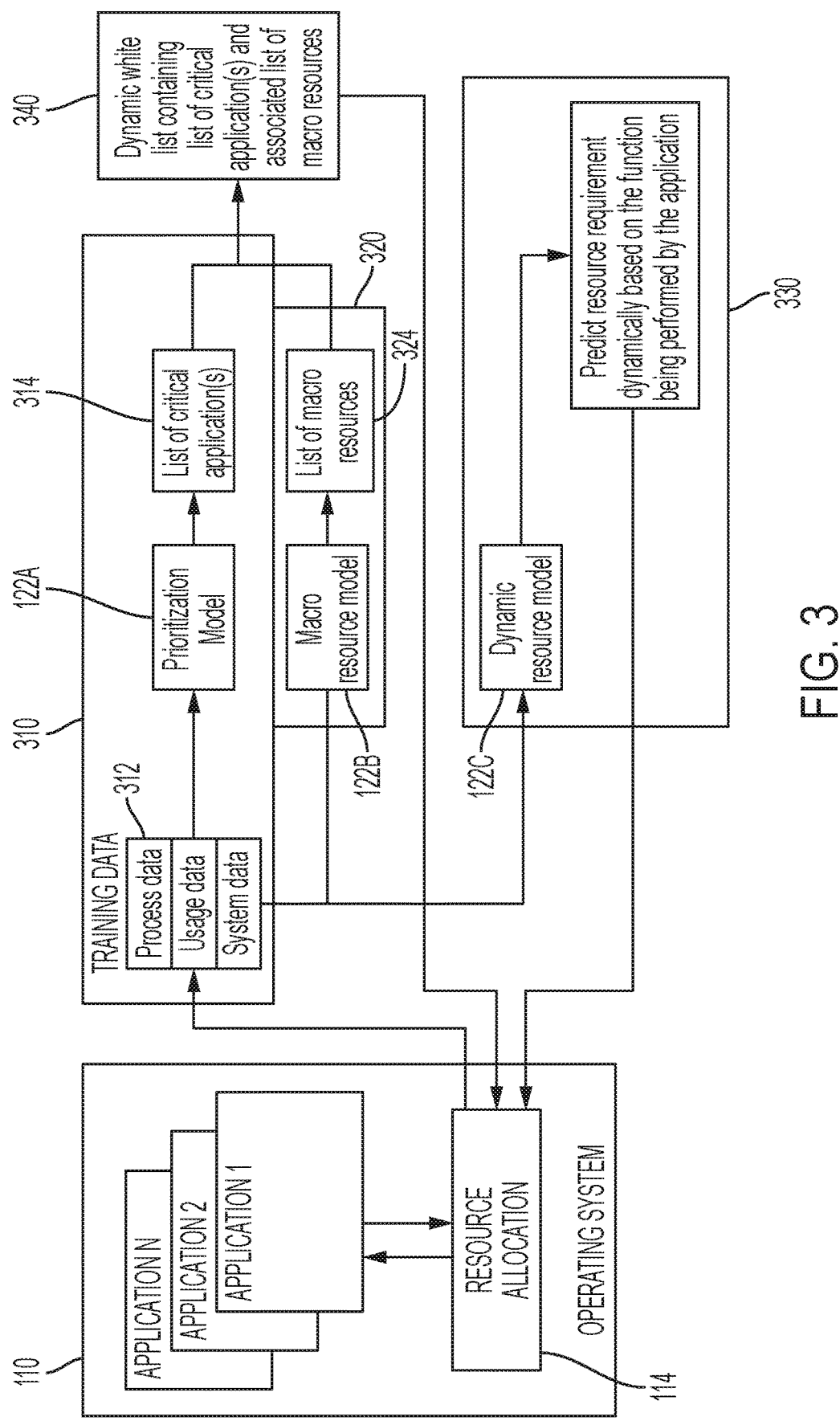
FIG. 3 is a block diagram illustrating a three model-based allocation of resources on an information handling system according to some embodiments of the disclosure.

The operation of a model-based resource allocation system according to one embodiment is shown in the block diagram of FIG. 3. FIG. 3 is a block diagram illustrating a three model-based allocation of resources on an information handling system according to some embodiments of the disclosure. A first process 310 includes the prioritization model 122A trained with training data 312 including process data, usage data, and system data, which is telemetry data collected by the operating system 110. The prioritization model 122A generates a list of critical applications 314. The first process 310 involves creating a dynamic whitelist of the most important applications for a user represented as the list 314. The list 314 may be created by collecting telemetry data describing user interaction with applications executed, the tasks performed, and resources utilized. This may be an iterative and continuous process, which will generate a dynamic list containing the most important applications for a user as the list 314.

A second process 320 includes the macro resource model 122B trained with training data 312. The macro resource model 122B generates an assignment of a macro resource for each application as list of macro resources 324. Determining the macro resource assignment involves evaluating the usage of an application for an individual user by training the macro resource model 122B to get the key performance indicators (KPIs), which includes determining the resource utilization of the applications and their use case for a user. In one embodiment, this resource utilization and use case determination may include collecting data for the resource that is primarily used by an application and updating the whitelist accordingly. For example, if an application is primarily performing CPU operations, the macro resource model 122B may assign the macro resource for the application to be CPU. If this changes over time, such as if the user starts primarily using the same application for I/O operations, the whitelist may be updated to assign the macro resource for the application be I/O. In another embodiment, this resource utilization and use case determination may additionally or alternatively include determining the activity that is important for the application, such as low launch time for webapps such as video players and low time to completion for computer assisted design (CAD) applications. These will form KPIs and the macro resource model 122B will be trained from training data 312 to predict the KPIs based on the application and the corresponding resource requirement. The whitelist of macro resources may be the list of macro resources 324. The list of critical applications 314 and the associated list of macro resources 324 may be combined into a dynamic whitelist 340 containing a list of critical applications 314 and the associated list of macro resources 324. The dynamic whitelist 340 may be provided to the resource allocation system 114 for use during the allocation of system resources to an application.

A third process 330 operates to determine, such as by predicting, the resource utilization by a target application dynamically during runtime of the target application, detect bottlenecks in system resources, and allocate the system resources to improve target application performance and reduce bottlenecks. The dynamic resource model 122C is trained by the training data 312. The dynamic resource model 122C may be a machine learning model trained on telemetry data including application usage data and system data to predict the resource requirement of the target application at runtime. If the resource requirement is different than the one allocated or indicated by the macro resource, then system resources allocations may be adjusted based on real-time use.

Machine learning models, as used in embodiments of this application, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received environmental data, and a system or environmental characteristic and/or a degree to which such an influencing attribute affects the outcome of such a system or environmental characteristic.

Figure 4:
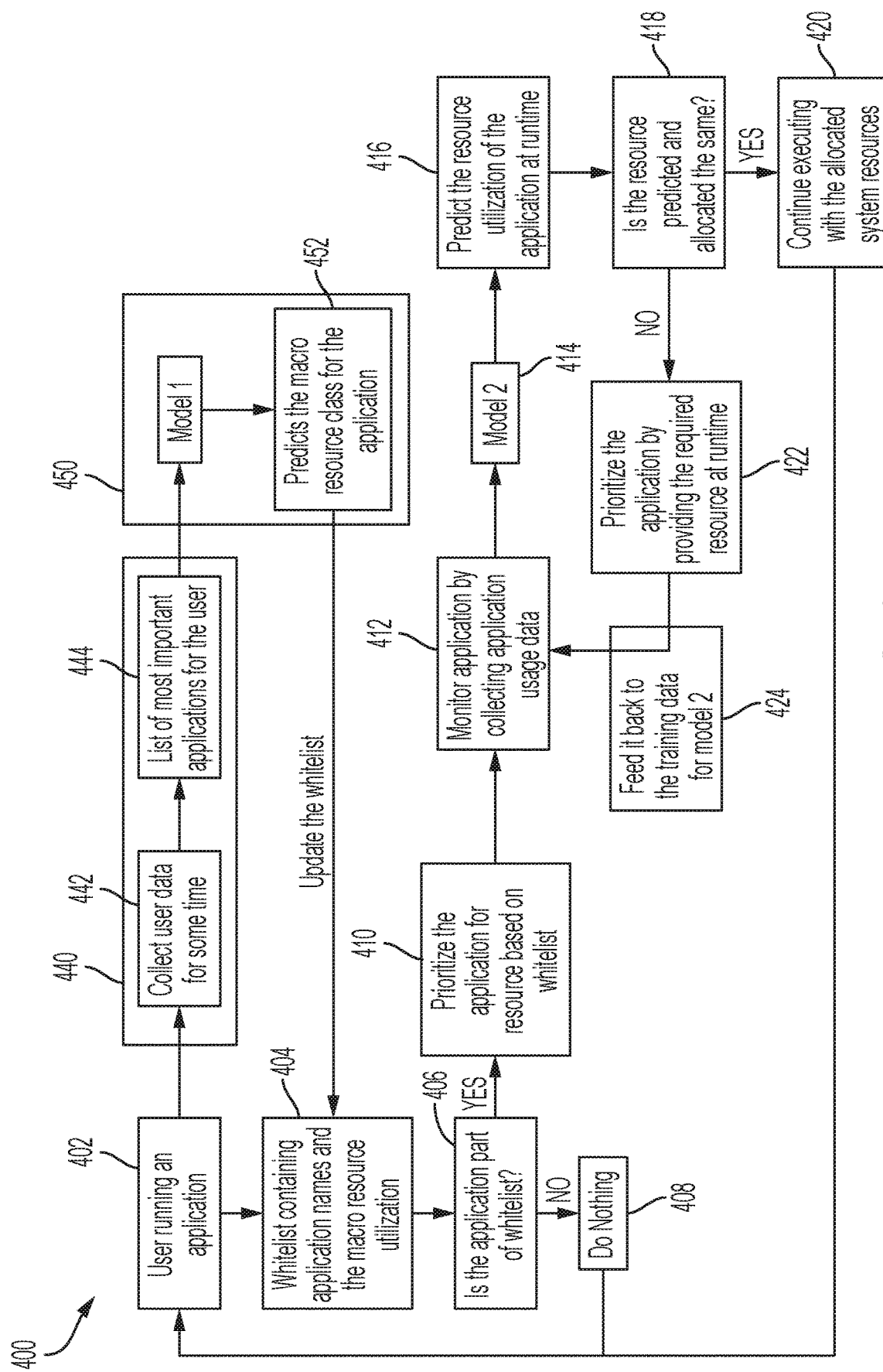
FIG. 4 is a flow chart illustrating a method for allocating resources with a model-based allocation of resources on an information handling system according to some embodiments of the disclosure.

The execution of a model-based resource allocation system, such as using models of the system of FIG. 3 is shown in FIG. 4. FIG. 4 is a flow chart illustrating a method for allocating resources with a model-based allocation of resources on an information handling system according to some embodiments of the disclosure. A method 400 begins at block 402, a user executes an application on the information handling system (IRS). At block 404, a whitelist is received containing a list of application names (or other identifier of the executing application) and an associated macro resource utilization. At block 406, the IHS determines whether the application executed at block 402 is on the whitelist received at block 404. If not, no changes to the resource allocation within the IHS are made and resources may be assigned by the IHS according to default rules at block 406. The whitelist is determined in process 440 by collecting user data such as telemetry data at block 442 and determining a list of most important applications for the user at block 444 based on the user data. Resources are associated with the applications on the list determined at block 444 in process 450. The process 450 includes application of a model at block 452 to the user data and determination of a macro resource class for each of the applications determined on the list at block 444. The association of the most important applications for the user and the predicted macro resource class for each of the important applications forms a whitelist that is retrieved at block 404. Since the set of important applications differ by user, we create a dynamic whitelist containing the most prioritized applications. The macro classification of applications from a resource perspective will also differ based on the use case of the application by the user. The list of important applications may differ by user, such that the dynamic generation of the whitelist may accommodate the user's particular use of applications on the IHS. The macro classification of applications from a resource perspective may also differ based on the use case of the application by different users.

If the application is determined to be on the whitelist at block 406, then the method 400 continues to block 410 to prioritize resource allocation for the system resource associated with the application in the whitelist. The process continues to determine resource allocations by proceeding to block 412 to monitor application resource usage by collecting application usage data and to block 414 to train a model based on the monitoring at block 412. The model predicts resource utilization for the application during runtime being executed at block 416, and the predictions may be used for assigning system resources to the application. At block 418, the IHS determines if the resource predicted by the model at block 416 and the assigned system resources are the same. If so, the application continues executing with the allocated system resources at block 420. If the predicted and allocated system resources are different, the method 400 continues to block 422 to prioritize the application by providing different or additional system resources based on the predicted system resources of block 416. The adjustment to allocated system resources to improve the application responsiveness may be fed back at block 424 to the model for predicting resource utilization.

Figure 5:
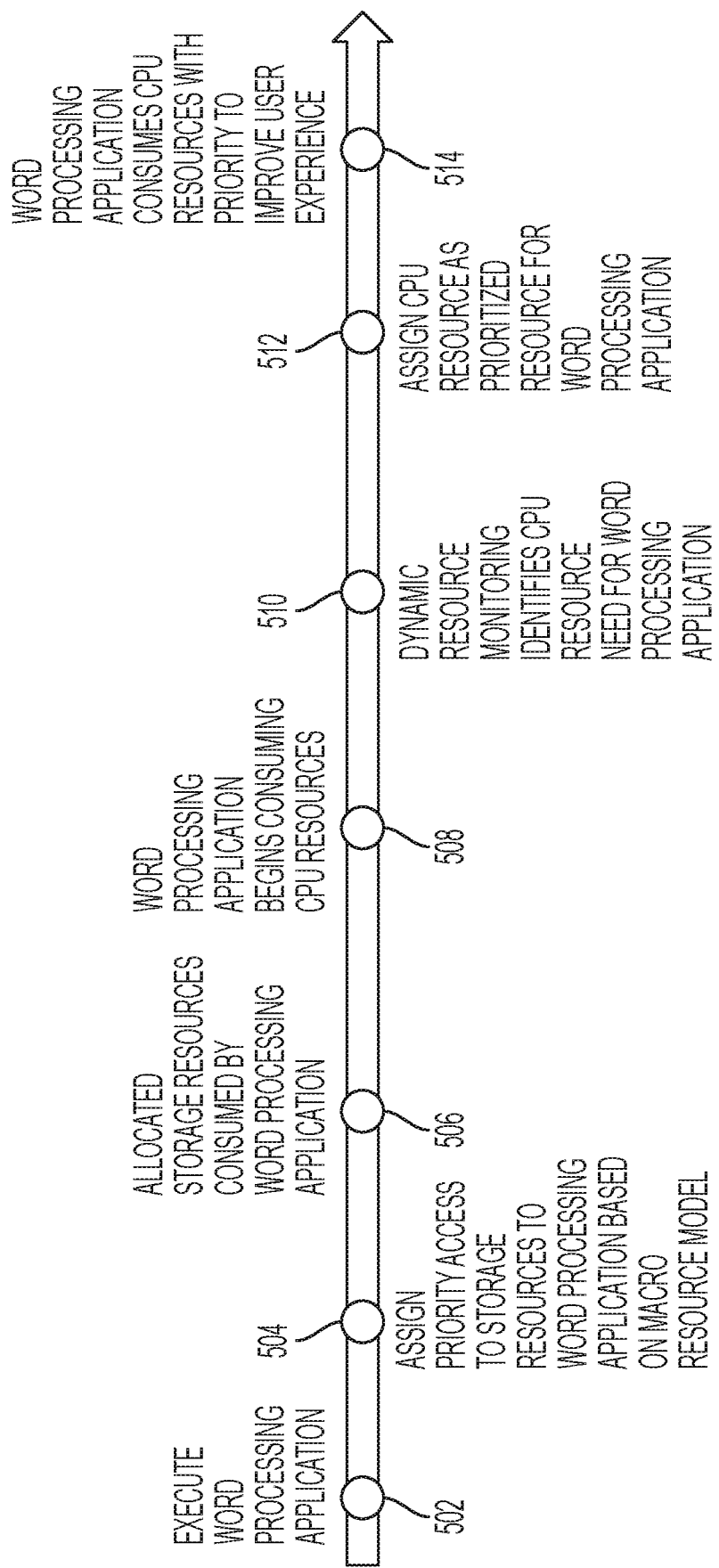
FIG. 5 is an example application for allocating resources on an information handling system according to some embodiments of the disclosure.

An example application of the model-based resource allocation described in embodiments of this application as applied to an application is shown in FIG. 5. FIG. 5 is an example application for allocating resources on an information handling system according to some embodiments of the disclosure. At time 502, a user executes a word processing application on an information handling system (IHS). The resource allocation system of the IHS may determine the word processing application as a priority application for the user based on a prioritization model and determine the word processing application has an associated macro resource of storage based on a macro resource model. At time 504, the resource allocation system assigns priority access to storage resources to the word processing application based on a macro resource model. At time 506, the allocated storage resources are used by the word processing application. At time 508, the word processing application begins executing a processing-intensive workload which may consume CPU resources. A dynamic resource model of the IHS determines how the word processing application would benefit from additional CPU resources to improve user responsiveness. At time 510, the resource allocation system of the IHS identifies the CPU as the macro resource for the word processing application. At time 512, the resource allocation system of the IHS the assigns the CPU as the macro resources for the word processing application. At time 514, the word processing application uses the allocated CPU resources with priority over other applications to improve the user experience by being more responsive to user requests.

Figure 6:
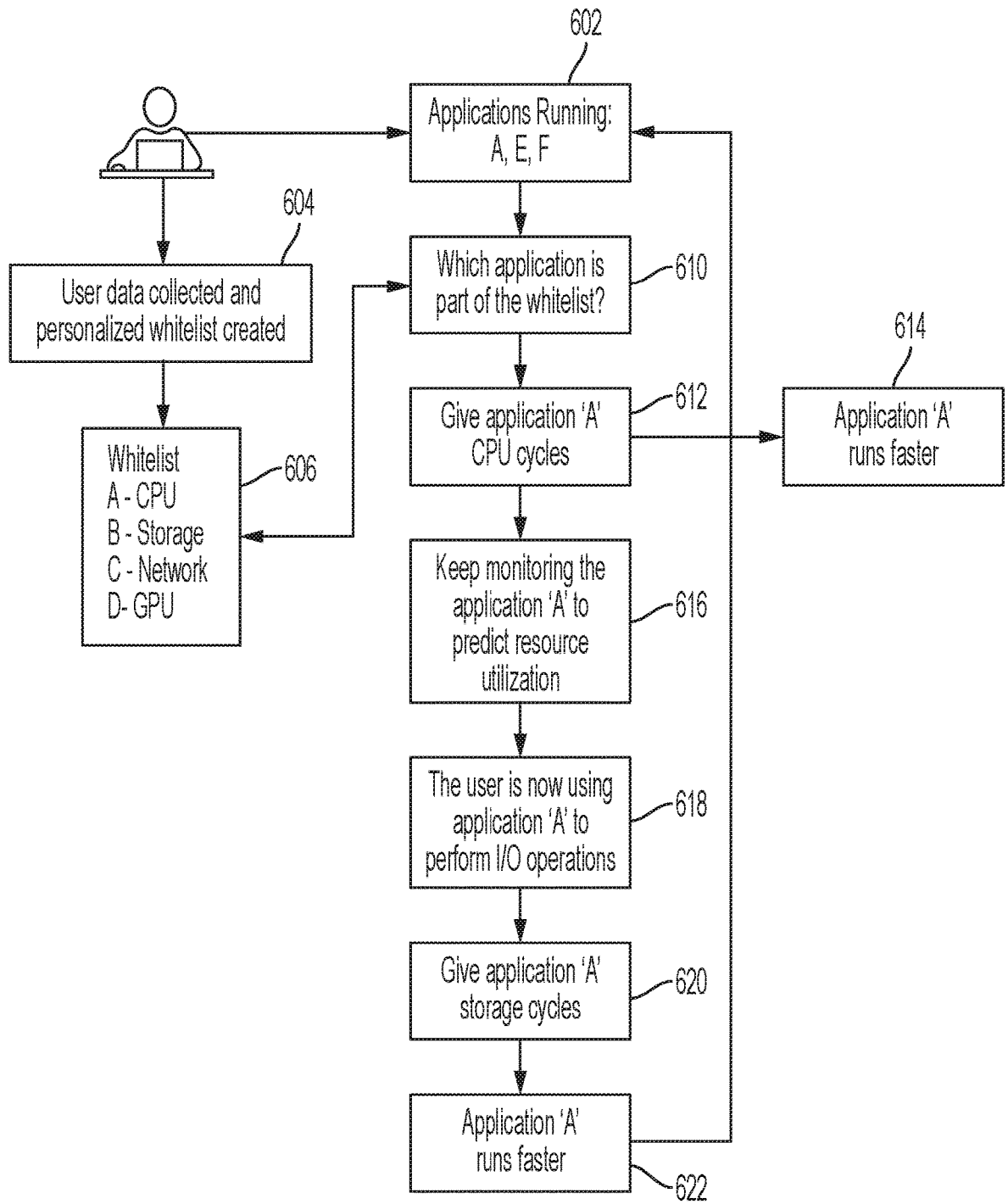
FIG. 6 is another example application for allocating resources on an information handling system according to some embodiments of the disclosure.

Another example application of the model-based resource allocation described in embodiments of this application as applied to an application is shown in FIG. 6. FIG. 6 is another example application for allocating resources on an information handling system according to some embodiments of the disclosure. A user executes applications 'A', 'E', and 'F' at block 602. At block 604, a whitelist is generated for the user, with separate dynamic whitelists generated for other users of the IHS, with the dynamic whitelist based on the user's application priorities. One example whitelist is shown in block 606, indicating applications 'A', 'B', 'C' and 'D' are on the whitelist with associated macro resource assignments of CPU, storage, network, and GPU, respectively. When the user is executing multiple applications, such as at block 602, the IHS determines at block 610 whether one of the executing applications is on the whitelist by comparing an identifier for the application to the whitelist of block 606. At block 612, the IHS determines that application 'A' is included on the whitelist, and is subsequently assigned prioritized access to CPU resources corresponding to the macro resource assignment. This improves the performance and responsiveness of application 'A' at block 614. The IHS continues at block 616 with monitoring the application 'A' to predict resource utilization of the application 'A'. At block 618, the user's use of the application 'A' changes to a I/O resource intensive workload. The dynamic resource model on the IHS may determine a change in resource consumption and/or a bottleneck in system resources, and then change resource allocation at block 620 to provide more I/O system resource such as storage cycles. This improves the performance and responsiveness of application 'A' at block 622. The other applications executing at block 602, applications 'E' and 'F', are not on the whitelist of block 606. The applications 'E' and 'F' are subsequently not provided prioritized access to any system resources, and in some embodiments, the applications 'E' and 'F' are also not assigned resources based on the dynamic resource model.

These example embodiments describe and illustrate various system resource allocation schemes for use in allocating system resources to applications executing on an information handling system (IHS). In some embodiments, applications may be prioritized in a two-phase process, prioritizing resources at a macro level and at a micro level. If an application's macro classification resource is listed in the dynamic whitelist, the application may be given priority to that resource, such as by prioritizing requests from that application for accessing the resource, providing more frequent access in a round robin procedure, or providing a larger share of the available resource. The application is further monitored for changing needs, such as if the application is needing a resource other than the one mentioned in the whitelist, and resources may be re-allocated based on this monitoring at the micro level. For example, if a word processing application begins performing computation tasks and requires additional CPU resources, then the word processing application is provided additional CPU cycles. The resource allocation schemes may be implemented in software executing on the information handling system, such as in computer instructions that are part of an operating system stored on a storage medium of the information handling system and/or executing on the information handling system. In other embodiments, instructions for executing the resource allocation schemes may be executed by an embedded controller (EC) of the IHS or other processor or controller of the IHS.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

An information handling system may include a variety of components to generate, process, display, manipulate, transmit, and receive information. One example of an information handling system 100 is shown in FIG. 7, which may implement the methods, models, and other functionality described above, such as with respect to IHS 700 of FIG. 7. Any of the resources described herein as part of the IHS 700 may be allocatable resources made available to applications executing on the IHS 700. IHS 700 may include one or more central processing units (CPUs) 702. In some embodiments, IHS 700 may be a single-processor system with a single CPU 702, while in other embodiments IHS 700 may be a multi-processor system including two or more CPUs 702 (e.g., two, four, eight, or any other suitable number). CPU(s) 702 may include any processor capable of executing program instructions. For example, CPU(s) 702 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 702 may commonly, but not necessarily, implement the same ISA.

CPU(s) 702 may be coupled to northbridge controller or chipset 704 via front-side bus 706. The front-side bus 706 may include multiple data links arranged in a set or bus configuration. Northbridge controller 704 may be configured to coordinate I/O traffic between CPU(s) 702 and other components. For example, northbridge controller 704 may be coupled to graphics device(s) 708 (e.g., one or more video cards or adaptors, etc.) via graphics bus 710 (e.g., an Accelerated Graphics Port or AGP bus, a Peripheral Component Interconnect or PCI bus, etc.). Northbridge controller 704 may also be coupled to system memory 712 via memory bus 714. Memory 712 may be configured to store program instructions and/or data accessible by CPU(s) 702. In various embodiments, memory 712 may be implemented using any suitable memory technology, such as static RAM (SRAM), synchronous dynamic RAM (SDRAM), nonvolatile/Flash-type memory, or any other type of memory.

Northbridge controller 704 may be coupled to southbridge controller or chipset 716 via internal bus 718. Generally, southbridge controller 716 may be configured to handle various of IHS 700's I/O operations, and it may provide interfaces such as, for instance, Universal Serial Bus (USB), audio, serial, parallel, Ethernet, etc., via port(s), pin(s), and/or adapter(s) 732 over bus 734. For example, southbridge controller 716 may be configured to allow data to be exchanged between IHS 700 and other devices, such as other IHS s attached to a network. In various embodiments, southbridge controller 716 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 716 may also enable connection to one or more keyboards, keypads, touch screens, scanning devices, voice or optical recognition devices, or any other devices suitable for entering or retrieving data. Multiple I/O devices may be present in IHS 700. In some embodiments, I/O devices may be separate from IHS 700 and may interact with IHS 700 through a wired or wireless connection. As shown, southbridge controller 716 may be further coupled to one or more PCI devices 720 (e.g., modems, network cards, sound cards, video cards, etc.) via PCI bus 722. Southbridge controller 716 may also be coupled to Basic I/O System (BIOS) 724, Super I/O Controller 726, and Baseboard Management Controller (BMC) 728 via Low Pin Count (LPC) bus 730.

IHS 700 may be configured to access different types of computer-accessible media separate from memory 712. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 700 through various interfaces, such as universal serial bus (USB) interfaces, via northbridge controller 704 and/or southbridge controller 716. Some such mediums may be coupled to the IHS through a Super I/O Controller 726 combines interfaces for a variety of lower bandwidth or low data rate devices. Those devices may include, for example, floppy disks, parallel ports, keyboard and mouse and other user input devices, temperature sensors, and/or fan speed monitoring.

BIOS 724 may include non-volatile memory having program instructions stored thereon. The instructions stored on the BIOS 724 may be usable by CPU(s) 702 to initialize and test other hardware components. The BIOS 724 may further include instructions to load an Operating System (OS) for execution by CPU(s) 702 to provide a user interface for the IHS 700, with such loading occurring during a pre-boot stage. In some embodiments, firmware execution facilitated by the BIOS 724 may include execution of program code that is compatible with the Unified Extensible Firmware Interface (UEFI) specification, although other types of firmware may be used.

BMC controller 728 may include non-volatile memory having program instructions stored thereon that are usable by CPU(s) 702 to enable remote management of IHS 700. For example, BMC controller 728 may enable a user to discover, configure, and/or manage BMC controller 728. Further, the BMC controller 728 may allow a user to setup configuration options, resolve and administer hardware or software problems, etc. Additionally or alternatively, BMC controller 728 may include one or more firmware volumes, each volume having one or more firmware files used by the BIOS firmware interface to initialize and test components of IHS 700.

Figure 7:
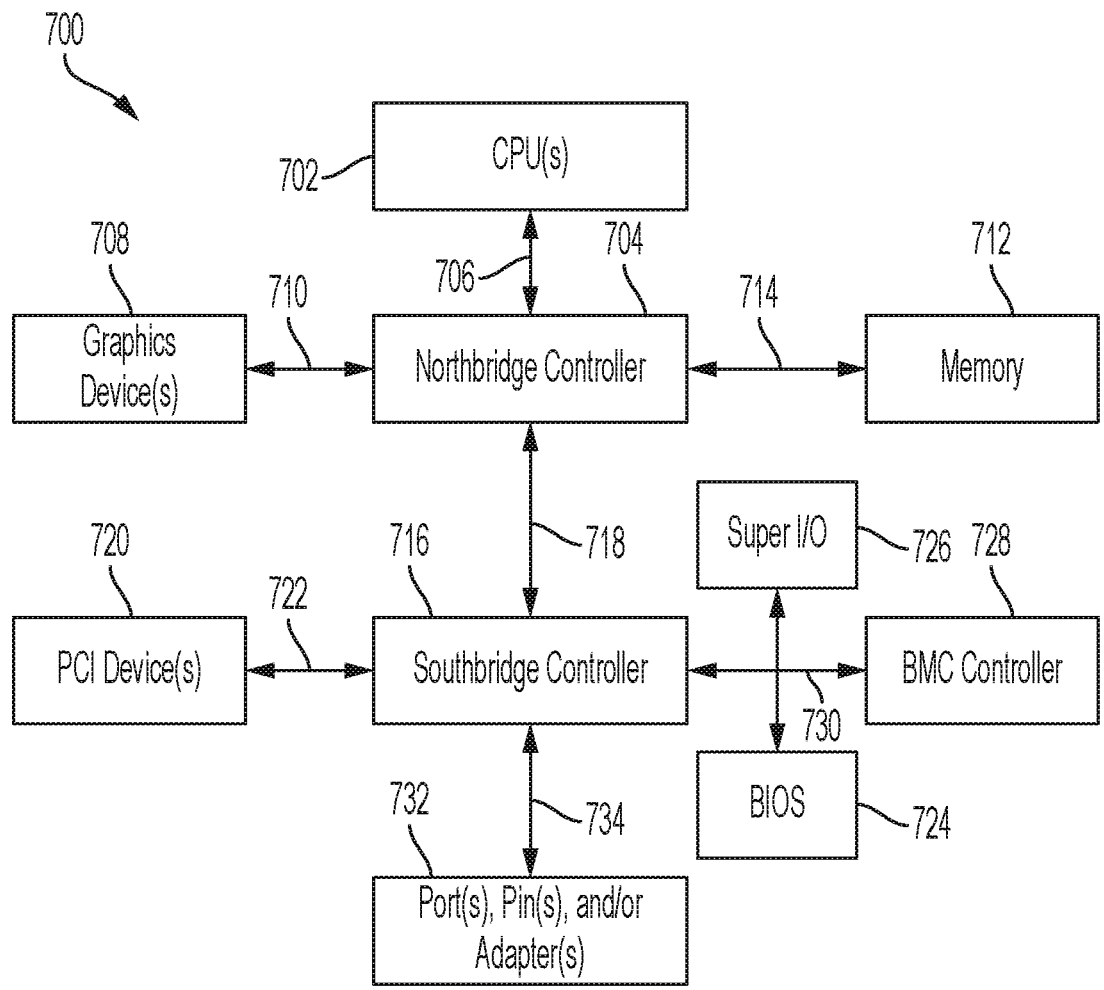
FIG. 7 is a schematic block diagram of an example information handling system according to some embodiments of the disclosure.

One or more of the devices or components shown in FIG. 7 may be absent, or one or more other components may be added. Further, in some embodiments, components may be combined onto a shared circuit board and/or implemented as a single integrated circuit (IC) with a shared semiconductor substrate. For example, northbridge controller 704 may be combined with southbridge controller 716, and/or be at least partially incorporated into CPU(s) 702. Accordingly, systems and methods described herein may be implemented or executed with other computer system configurations. In some cases, various elements shown in FIG. 7 may be mounted on a motherboard and enclosed within a chassis of the IHS 700.

The schematic flow chart diagrams of FIG. 2 and FIG. 4 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can include random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
executing, by an information handling system, an application for a user, wherein executing an application for a user comprises:
determining, by the information handling system via a machine learning model, a priority of the application to the user, wherein the machine learning model determines the priority based, at least in part, on telemetry data, wherein the telemetry data describe user interactions performed with the application, tasks performed by the application, and resources utilized by the application;
subsequent to the determination of the priority of the application, placing the application on the whitelist;
based on the application is on the application whitelist, allocating system resources of the information handling system to the application by performing steps comprising:
determining, by the information handling system, a macro classification for the application based on a resource utilization associated with the application from the application whitelist using a second model, wherein the second model is trained, at least in part, on the telemetry data and characteristic information associated with resource utilization for tasks performed by the application;
determining, by the information handling system, system resources for functions being performed by the application using a third model, wherein the third model is trained, at least in part, on the telemetry data and real-time metrics associated with resources for tasks performed by the application;
allocating, by the information handling system, the system resources based, at least in part, on the macro classification and the system resources for tasks performed by the application;
updating, by the information handling system, usage of the allocated system resources of the information handling system by the application;
updating, by the information handling system, the macro classification for the application whitelist based, at least in part, on the updated usage of the system resources using the second model;
updating, by the information handling system, the resource utilization for tasks performed by the application based, at least in part, on the updated usage of the system resources using the third model; and
reallocating, by the information handling system, the system resources based, at least in part, on the updated macro classification and the updated resource utilization for tasks performed by the application.

2. The method of claim 1, wherein updating the application whitelist comprises updating the macro classification for resource utilization associated with the application on the application whitelist.

3. The method of claim 1, wherein the third model is trained to predict resource usage by the application based on a function being performed by the application.

4. An information handling system, comprising:
a processor;
a memory coupled to the processor,
wherein the processor is configured to perform operations comprising:
executing an application for a user, wherein executing an application for a user comprises:
determining, via a machine learning model, a priority of the application to the user, wherein the machine learning model determines the priority based, at least in part, on telemetry data, wherein the telemetry data describe user interactions performed with the application, tasks performed by the application, and resources utilized by the application;
subsequent to the determination of the priority of the application, placing the application on the whitelist;
based on the application being placed on the application whitelist allocating system resources of the information handling system to the application by performing steps comprising:
determining a macro classification for the application based on a resource utilization associated with the application from the application whitelist using a second model, wherein the second model is trained, at least in part, on the telemetry data and characteristic information associated with resource utilization for tasks performed by the application;
determining a system resources for functions being performed by the application using a third model, wherein the third model is trained, at least in part, on the telemetry data and real-time metrics associated with resources for tasks performed by the application;
allocating the system resources based, at least in part, on the macro classification and the system resources for tasks performed by the application;
updating usage of the allocated system resources of the information handling system by the application;
updating the macro classification for the application whitelist based, at least in part, on the updated usage of the system resources using the second model;
updating the resource utilization for tasks performed by the application based, at least in part, on the updated usage of the system resources using the third model; and
reallocating the system resources based, at least in part, on the updated macro classification and the updated resource utilization for tasks performed by the application.

5. The information handling system of claim 4, wherein updating the application whitelist comprises updating the utilization associated with the application on the application whitelist.

6. The information handling system of claim 4, wherein the third model is trained to predict resource usage by the application based on a function being performed by the application.

7. A computer program product, comprising:
a non-transitory computer readable medium comprising code executable by a processor for performing operations comprising:
executing an application for a user, wherein executing an application for a user comprises:
determining, via a machine learning model, a priority of the application to the user, wherein the machine learning model determines the priority based, at least in part, on telemetry data, wherein the telemetry data describe user interactions performed with the application, tasks performed by the application, and resources utilized by the application;
subsequent to the determination of the priority of the application, placing the application on the whitelist;
based on the application being placed on the application whitelist allocating system resources of the information handling system to the application by performing steps comprising:
determining a macro classification for the application based on a resource utilization associated with the application from the application whitelist using a second model, wherein the second model is trained, at least in part, on the telemetry data and characteristic information associated with resource utilization for tasks performed by the application;
determining a system resources for functions being performed by the application using a third model, wherein the third model is trained, at least in part, on the telemetry data and real-time metrics associated with resources for tasks performed by the application;
allocating the system resources based, at least in part, on the macro classification and the system resources for tasks performed by the application;
updating usage of the allocated system resources of the information handling system by the application;
updating the macro classification for the application whitelist based, at least in part, on the updated usage of the system resources using the second model;
updating the resource utilization for tasks performed by the application based, at least in part, on the updated usage of the system resources using the third model; and
reallocating the system resources based, at least in part, on the updated macro classification and the updated resource utilization for tasks performed by the application.

8. The computer program product of claim 7, wherein updating the application whitelist comprises updating the resource utilization associated with the application on the application whitelist.

9. The computer program product of claim 7, wherein the third model is trained to predict resource usage by the application based on a function being performed by the application.

* * * * *